(12) United States Patent
Hirakata et al.

(10) Patent No.: US 10,365,419 B2
(45) Date of Patent: Jul. 30, 2019

(54) POLARIZING PLATE

(71) Applicant: FUJIFILM Corporation, Tokyo (JP)

(72) Inventors: Junichi Hirakata, Minami-ashigara (JP); Yujiro Yanai, Minami-ashigara (JP); Yoshiaki Hisakado, Minami-ashigara (JP); Kunihiro Atsumi, Minami-ashigara (JP); Yukito Saitoh, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/691,235

(22) Filed: Aug. 30, 2017

(65) Prior Publication Data

US 2017/0363791 A1    Dec. 21, 2017

Related U.S. Application Data

(63) Continuation of application No. PCT/JP2016/059578, filed on Mar. 25, 2016.

(30) Foreign Application Priority Data

Mar. 25, 2015    (JP) .................................. 2015-063258

(51) Int. Cl.
*G02B 5/30* (2006.01)
*G02F 1/1335* (2006.01)
(Continued)

(52) U.S. Cl.
CPC ............. *G02B 5/3016* (2013.01); *G02B 5/30* (2013.01); *G02F 1/1335* (2013.01);
(Continued)

(58) Field of Classification Search
CPC ... G02B 5/30; G02B 5/3016; G02F 1/133528; G02F 2001/133538; G02F 2201/54; G02F 2413/09; B29D 11/00644; B29K 2033/12
See application file for complete search history.

(56) References Cited

U.S. PATENT DOCUMENTS 5,828,488 A     10/1998  Ouderkirk et al.
2001/0030726 A1  10/2001  Yoshida et al.
(Continued)

FOREIGN PATENT DOCUMENTS

EP   2662712 A1 * 11/2013 ....... B29D 11/00644
JP   2005-309110 A    11/2005
(Continued)

OTHER PUBLICATIONS

A Japanese Notification of Reasons for Refusal for corresponding Japanese Application No. 2017-508456, dated Jun. 5, 2018, with machine translation.
(Continued)

*Primary Examiner* — Angela K Davison
(74) *Attorney, Agent, or Firm* — Birch, Stewart, Kolasch & Birch, LLP

(57) ABSTRACT

The polarizing plate of the present invention includes a polarizer and an optical element that rotates a polarization plane of polarized light emitted from the polarizer, an orientation direction on a surface of the optical element on a polarizer side is parallel to an absorption axis of the polarizer, an orientation direction on a surface of the optical element opposite to the polarizer is perpendicular to the absorption axis of the polarizer, and $\Delta nd$ and a birefringence parameter $R_H$ of the optical element fall in a range of a predetermined region in an orthogonal coordinate in which $\Delta nd$ is indicated along a vertical axis and the birefringence parameter $R_H$ is indicated along a lateral axis.

6 Claims, 1 Drawing Sheet

(51) Int. Cl.
　　　*B29D 11/00*　　(2006.01)
　　　*B29K 33/00*　　(2006.01)
(52) U.S. Cl.
　　　CPC .... *B29D 11/00644* (2013.01); *B29K 2033/12* (2013.01); *G02F 1/133528* (2013.01); *G02F 2001/133538* (2013.01); *G02F 2201/54* (2013.01)

(56)　　　　References Cited

U.S. PATENT DOCUMENTS

| 2003/0089956 | A1 |   | 5/2003 | Allen et al. |
|---|---|---|---|---|
| 2005/0185124 | A1 |   | 8/2005 | Kadoya |
| 2008/0024700 | A1 |   | 1/2008 | Yoshimi |
| 2008/0074585 | A1 |   | 3/2008 | Yoshimi |
| 2015/0015830 | A1 | * | 1/2015 | Kim ................ G02F 1/133528 349/96 |

FOREIGN PATENT DOCUMENTS

| JP | 2005-321528 A | 11/2005 |
|---|---|---|
| JP | 2008-3512 A | 1/2008 |
| JP | 2008-26797 A | 2/2008 |
| JP | 2008-102471 A | 5/2008 |
| JP | 4091978 B2 | 5/2008 |
| JP | 2010-9056 A | 1/2010 |
| JP | 2011-112952 A | 6/2011 |
| JP | 2012-113478 A | 6/2012 |
| JP | 2012-252084 A | 12/2012 |
| JP | 2015-18217 A | 1/2015 |

OTHER PUBLICATIONS

International Preliminary Report on Patentability and Written Opinion of the International Searching Authority (Forms PCT/IB/373, PCT/IB/326 and PCT/ISA/237), dated Oct. 5, 2017, for International Application No. PCT/JP2016/059578, with an English translation of the Written Opinion.

International Search Report and English translation (Form PCT/ISA/210), dated Jun. 21, 2016, for International Application No. PCT/JP2016/059578.

* cited by examiner

POLARIZING PLATE

CROSS-REFERENCE TO RELATED APPLICATIONS

This application is a Continuation of PCT International Application No. PCT/JP2016/059578 filed on Mar. 25, 2016, which claims priority under 35 U.S.C. § 119(a) to Japanese Patent Application No. 2015-063258 filed on Mar. 25, 2015. The above application is hereby expressly incorporated by reference, in its entirety, into the present application.

BACKGROUND OF THE INVENTION

1. Field of the Invention

The present invention relates to a polarizing plate.

2. Description of the Related Art

In recent years, in response to an increase in the sizes of image display devices, a problem of liquid crystal panels being warped by the expansion and contraction of optical films such as polarizing plates has been created.

As a solution thereto, techniques for improving the warpage of liquid crystal panels by disposing the absorption axes of individual polarizers so as to be parallel to each other (parallel nicol disposition), contracting or expanding an upper polarizer and a lower polarizer in the same direction, and applying stress to liquid crystal cells in the same direction on both surface sides have been proposed (for example, refer to JP2015-18217A and the like).

SUMMARY OF THE INVENTION

Meanwhile, generally, liquid crystal display devices having a parallel nicol disposition can be used only in normally white modes, and thus the contrast ratio is low, and the image visibility degrades. Therefore, image visibility is improved by disposing stretching films having a $\lambda/2$ plate function that converts the vibration surface of polarized light emitted from polarizers 90 degrees and forming normally black modes. Meanwhile, in the case of the above-described disposition, it is necessary to set the angle formed between the slow axis of a stretching film having a $\lambda/2$ plate function and the absorption axis or transmission axis of a polarizer to 45°. Generally, the stretching direction of the stretching film and the slow axis direction become parallel or orthogonal to each other, and the stretching direction and the contraction or expansion direction become parallel or orthogonal to each other. That is, in a case in which a stretching film is produced by means of stretching in an ordinary transportation direction or stretching in a direction orthogonal to the transportation direction, the longitudinal direction of the stretching film does not coincide with the longitudinal direction of polarizers, and it is not possible to efficiently manufacture polarizing plates. In addition, in a case in which parallel nicol disposition is provided, the contraction or expansion directions of the polarizers become similar; however, in principle, it is not possible to make the contraction or expansion directions similar to the stretching film having a $\lambda/2$ plate function, which adversely affects the object of the remediation of warpage of liquid crystal panels.

Therefore, an object of the present invention is to provide a polarizing plate which achieves all of the additional remediation of warpage of image display elements, the remediation of tinting of the front surface, and the improvement of oblique brightness, which was difficult to solve in the related art, and furthermore, improves the polarizing plate acquisition efficiency compared with the related art.

The present inventors paid attention to optical elements that rotate the polarization planes of polarized light emitted from polarizers. Optical elements are not stretching films having a $\lambda/2$ plate function and remove the necessity of setting the axis relationship in a 45° direction, which is required in stretching films having a $\lambda/2$ plate function, by rotating the polarization planes of polarized light, and thus the consistent transportation manufacturing of films which is termed so-called roll-to-roll becomes possible, and it is possible to improve the polarizing plate acquisition efficiency.

Furthermore, since the use of the above-described optical element removes the necessity of setting the axis relationship in a 45° direction which is required in stretching films having a $\lambda/2$ plate function, contraction or expansion directions are not similar, and it is possible to remediate the problem of the deterioration of the warpage of image display elements.

Additionally, it is possible to satisfy both the remediation of tinting of the front surface and the improvement of oblique brightness by appropriately setting the $\Delta$nd and birefringence parameter $R_H$ of the optical element.

That is, it was found that the above-described object can be achieved by the following constitutions.

[1] A polarizing plate comprising: a polarizer; and an optical element that rotates a polarization plane of polarized light emitted from the polarizer, in which an orientation direction on a surface of the optical element on a polarizer side is parallel to an absorption axis of the polarizer, an orientation direction on a surface of the optical element opposite to the polarizer is perpendicular to the absorption axis of the polarizer, and $\Delta$nd and a birefringence parameter $R_H$ of the optical element fall in a range of a region surrounded by Point A at which $\Delta$nd is 400 nm and the birefringence parameter $R_H$ is 0 degrees, Point B at which $\Delta$nd is 400 nm and the birefringence parameter $R_H$ is −11.6 degrees, Point C at which $\Delta$nd is 600 nm and the birefringence parameter $R_H$ is −24.9 degrees, and Point D at which $\Delta$nd is 600 nm and the birefringence parameter $R_H$ is 0 degrees in an orthogonal coordinate in which $\Delta$nd is indicated along a vertical axis and the birefringence parameter $R_H$ is indicated along a lateral axis.

Here, the region refers to a region surrounded by a straight line connecting Point A and Point B, a straight line connecting Point B and Point C, a straight line connecting Point C and Point D, and a straight line connecting Point D and Point A.

[2] The polarizing plate according to [1], in which the optical element is an optical element which includes a liquid crystal compound and is optically rotary.

[3] The polarizing plate according to [1] or [2], further comprising: a brightness improvement film on a side of the polarizer opposite to the optical element, in which the absorption axis of the polarizer and a slow axis of the brightness improvement film are parallel to each other.

[4] The polarizing plate according to [3], in which manufacturing transportation directions of the polarizer and the brightness improvement film are parallel to each other.

According to the present invention, it is possible to provide a polarizing plate which achieves all of the additional remediation of warpage of image display elements, the remediation of tinting of the front surface, and the improvement of oblique brightness, which was difficult to solve in the related art, and furthermore, improves the polarizing plate acquisition efficiency compared with the related art.

DESCRIPTION OF THE PREFERRED EMBODIMENTS

Figure 1A:
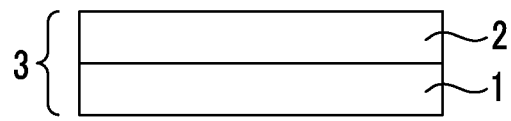
FIG. 1A is a schematic cross-sectional view illustrating an example of an embodiment of a polarizing plate of the present invention.

Hereinafter, the present invention will be described in detail.

In some cases, constituent requirements described below will be described on the basis of representative embodiments of the present invention, but the present invention is not limited to the embodiments.

Meanwhile, in the present specification, numerical ranges expressed using "to" include numerical values before and after the "to" as the lower limit value and the upper limit value.

In addition, in the present specification, polarizing plates refer to polarizing plates in which a polarizing plate protective layer or a functional layer is disposed on at least one surface of a polarizer, and polarizers and polarizing plates are distinctively used. However, in a case in which the absorption axis and transmission axis of a polarizing plate are mentioned, the absorption axis and transmission axis refer to the absorption axis and transmission axis of a polarizer included in the polarizing plate.

In addition, in the present specification, being parallel or orthogonal refers not only to being strictly parallel or orthogonal but also to being ±5° parallel or orthogonal.

<λ/2 Plate>

In the present specification, a λ/2 plate refers to a phase difference plate in which the in-plane phase difference is approximately half of a wavelength and specifically refers to a phase difference plate in which the in-plane phase difference Re(550) at a wavelength of 550 nm is 220 nm to 320 nm.

<Retardation>

In the present invention, Re(550) and Rth(550) respectively represent in-plane retardation and thickness-direction retardation at a wavelength of 550 nm.

In the present invention, Re(550) and Rth(550) are values measured at 550 nm in AxoScan OPMF-1 (manufactured by Opto Science, Inc.). Specifically, in a case in which the average refractive index ((nx+ny+nz)/3) and the film thickness (d(μm)) are input to AxoScan, it is possible to compute Slow axis direction)(°
Re(550)=R0(550)
Rth(550)=((nx+ny)/2−nz)×d.

Meanwhile, nx represents the refractive index in the slow axis direction in the plane, ny represents the refractive index in a direction orthogonal to nx in the plane, and nz represents the refractive index in a direction orthogonal to nx and ny.

However, in optical elements that are used in the polarizing plate of the present invention, since the optical axes rotate in the film thickness direction, it is not possible to accurately measure ordinarily-used Re and Rth. In principle, Re and Rth can be measured by dividing an optical element into thin layer segments the rotation of which can be ignored; however, in a case in which an optical element is divided so as to have a rotation angle of approximately two to three degrees at which the rotation can be substantially ignored, it is necessary to divide the optical element into 30 or more layers, which is unrealistic. Therefore, in the present invention, Δnd and a birefringence parameter $R_H$ described below will be used.

<Rotation Angle of Polarization>

In the present invention, the rotation angle of polarization is the value of circular retardance that is computed using AxoScan OPMF-1 (manufactured by Opto Science, Inc.).

<Rotation Angle of Liquid Crystal Compound>

In the present invention, the rotation angle of a liquid crystal compound represents, in a case in which an optical rotary element includes a liquid crystal compound, the angle formed by the in-plane slow axis on one surface side and the in-plane slow axis on the opposite surface side.

The in-plane slow axes on the respective surface sides are measured using AxoScan OPMF-1 (manufactured by Opto Science, Inc.) and the attached device analysis software Axometrics Multi-Layer Analysis.

<Δnd>

In the present invention, the degree of the in-plane phase difference is represented by Δnd. Δnd is the product of the refractive index difference in a fine region in the film thickness direction and the film thickness and an in-plane phase difference value excluding the rotation of the slow axis and becomes the same value as Re in a case in which the slow axis does not rotate. Δnd is measured using AxoScan OPMF-1 (manufactured by Opto Science, Inc.) and the attached device analysis software Axometrics Multi-Layer Analysis.

<$R_H$>

$R_H$ is the birefringence value that can be computed from the Mueller matrix which can be measured using AxoScan and is a parameter that serves as a basis for the computation of Re and Rth in AxoScan.

In the present invention, $R_H$ was computed using AxoScan OPMF-1 in the following manner from the Mueller matrix measured in a direction of an azimuthal angle of 0 degrees and a polar angle of 60 degrees with respect to the slow axis of a surface on the measurement light incidence side.

Regarding the Mueller matrix, three birefringence component values $R_H$, $R_{45}$, and $R_C$ are obtained in the following manner on the basis of the Mueller matrix measured using a measurement instrument AxoScan.

The Mueller matrix can be decomposed (polar decomposition) into the following three matrices.

$$M = M_{dep} M_{ret} M_{diatt} \qquad (7)$$

Here, $M_{dep}$, $M_{ret}$, and $M_{diatt}$ are matrices representing depolarization, birefringence, and absorption respectively.

Among these, the birefringence of $M_{ret}$ is particularly important. In a case in which $M_{ret}$ is analyzed, $M_{ret}$ can be divided into three components ($R_H$: up, down, right and left component, R45: ±45-degree component, and $R_C$: right and left optical rotation component).

As the decomposition method, the method of S. Y. Lu and R. A. Chipman, J. Opt Soc. Am A. 13(1996) 1106 was used. Here, the summary of the calculation method will be described.

$M_{diatt}$ representing absorption is represented by the following expression.

$$M_{diatt} = T_u \begin{bmatrix} 1 & \vec{D}^T \\ \vec{D} & m_D \end{bmatrix} \quad (8)$$

$$T_u = m_{11}, \vec{D} = \frac{1}{m_{11}} \begin{bmatrix} m_{12} \\ m_{13} \\ m_{14} \end{bmatrix} \quad (9)$$

$$m_D = \sqrt{1-D^2}\, I + (1 - \sqrt{1-D^2})\vec{D}\vec{D}^T$$

Here, $m_{ij}$ is the component (i, j=1, 2, 3, and 4) of M. Again, M is represented by Expression (10).

$$M = m_{00} \begin{bmatrix} 1 & \vec{D}^T \\ \vec{P} & m \end{bmatrix} \quad (10)$$

In a case in which a matrix obtained by multiplying the right-hand side of Expression (7) by the inverse matrix of $M_{diatt}$ is represented by M', M' becomes $$M' = MM_{diatt}^{-1} = M_{dep}M_{ret} = \quad (11)$$

$$\begin{bmatrix} 1 & \vec{0}^T \\ \vec{P}_\Delta & m' \end{bmatrix} = \begin{bmatrix} 1 & \vec{0}^T \\ \vec{P}_\Delta & m_\Delta m_R \end{bmatrix} = \begin{bmatrix} 1 & \vec{0}^T \\ \vec{P}_\Delta & m_\Delta \end{bmatrix} \begin{bmatrix} 1 & \vec{0}^T \\ \vec{0} & m_R \end{bmatrix},$$

$M_{dep}$ representing depolarization and $M_{ret}$ representing birefringence respectively become $$M_{dep} = \begin{bmatrix} 1 & \vec{0}^T \\ \vec{P}_\Delta & m_\Delta \end{bmatrix}, M_{ret} = \begin{bmatrix} 1 & \vec{0}^T \\ \vec{0} & m_R \end{bmatrix}. \quad (12)$$

Here, $$\vec{P}_\Delta = \frac{\vec{P} - m\vec{D}}{1-D^2}, \quad m' = m_\Delta m_R. \quad (13)$$

In addition, $m_\Delta$ is obtained using the following expression.

$$m_\Delta = \pm [m'(m')^T + (\sqrt{\lambda_1 \lambda_2} + \sqrt{\lambda_2 \lambda_3} + \sqrt{\lambda_3 \lambda_1})I]^{-1} \times [(\sqrt{\lambda_1} + \sqrt{\lambda_2} + \sqrt{\lambda_3})m'(m')^T + \sqrt{\lambda_1 \lambda_2 \lambda_3}I] \quad (14)$$

Here, the first reference sign is the minus sign in a case in which the determinant of matrix is negative and is the plus sign in a case in which the determinant of matrix is positive.

In addition, $\lambda_1$, $\lambda_2$, and $\lambda_3$ are the intrinsic values of $m'(m')^T$.

In addition, $m_R$ is obtained from the following expression using the inverse matrix of $m_\Delta$ and m'.

$$m_R = m_\Delta^{-1} m' \quad (15)$$

On the basis of what has been described above, an arbitrary Mueller matrix M can be decomposed into the three matrices ($M_{dep}$ is depolarization, $M_{ret}$ is birefringence, and $M_{diatt}$ is absorption) of Expression (7).

In addition, from $M_{ret}$ in Expression (12), R, $\alpha 1$, $\alpha 2$, and $\alpha 3$ are obtained using $$R = \cos^{-1}\left[\frac{tr(M_R)}{2} - 1\right], \quad (16)$$

$$a_i = \frac{1}{2\sin R} \sum_{j,k=1}^{3} \epsilon_{ijk}(m_R)jk.$$

R, $\alpha 1$, $\alpha 2$, and $\alpha 3$ are input into Expression (17), thereby obtaining $R_H$, $R_{45}$, and $R_C$.

$$\begin{pmatrix} Ra_1 \\ Ra_2 \\ Ra_3 \end{pmatrix} \equiv \begin{pmatrix} R_H \\ R_{45} \\ R_C \end{pmatrix}. \quad (17)$$

The details of the above-described calculations are described in detail in S. Y. Lu and R. A. Chipman, J. Opt Soc. Am A. 13(1996) 1106.

<Polarizing Plate>

FIG. 1A is a schematic cross-sectional view illustrating an example of an embodiment of the polarizing plate of the present invention.

A polarizing plate 3 illustrated in FIG. 1A has a polarizer 1 and an optical element 2 that rotates the polarization plane of polarized light emitted from the polarizer.

In addition, in the polarizing plate 3 illustrated in FIG. 1A, although not illustrated in FIG. 1A, the orientation direction on the surface of the optical element 2 on the polarizer 1 side is parallel to the absorption axis of the polarizer 1, and the orientation direction on the surface of the optical element 2 opposite to the polarizer 1 is perpendicular to the absorption axis of the polarizer 1.

The optical element 2 is preferably an optical element which includes a liquid crystal compound and is optically rotary since it is possible to further reduce the thickness of the polarizing plate.

In addition, between the polarizer 1 and the optical element 2, another layer, not illustrated, may be provided. Examples of another layer include an adhesive layer, an orientation film layer, and the like.

In addition, the optical element 2 may be disposed directly on the polarizer 1.

Figure 1B:
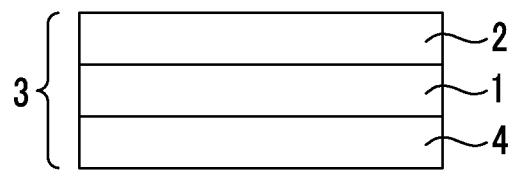
FIG. 1B is a schematic cross-sectional view illustrating another example of the embodiment of the polarizing plate of the present invention.

The polarizing plate of the present invention, as illustrated in FIG. 1B, preferably includes a brightness improvement film 4 on a side of the polarizer 1 opposite to the optical element 2.

In addition, in the polarizing plate 3 illustrated in FIG. 1B, although not illustrated in FIG. 1B, the absorption axis of the polarizer 1 and the slow axis (main stretching axis) of the brightness improvement film 4 are preferably parallel to each other.

In a case in which the above-described constitution is provided, it is possible to produce polarizing plates in a so-called roll-to-roll manner by making the manufacturing transportation direction of the optical element 2, the manufacturing transportation direction of the polarizer 1, and the manufacturing transportation direction of the brightness improvement film 4 coincide with one another, and the manufacturing acquisition efficiency of polarizing plates including brightness improvement films can be further improved.

In addition, between the polarizer 1 and the brightness improvement film 4, another layer, not illustrated, may be provided. Examples of another layer include an adhesive layer, a polarizer protective layer, and the like. In addition, the brightness improvement film 4 may be disposed directly on the polarizer 1.

<Image Display Device>

Figure 2A:
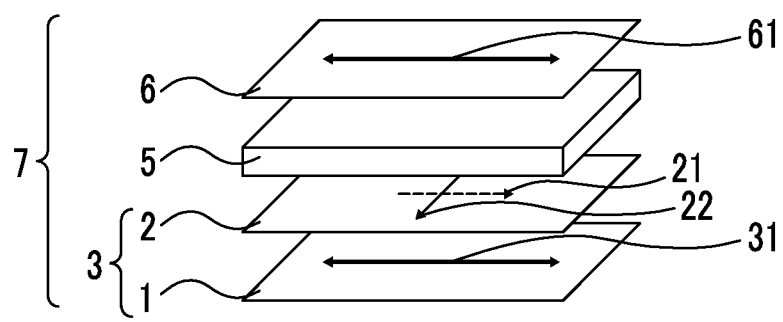
FIG. 2A is a schematic view illustrating an example of an embodiment of an image display device.

FIG. 2A is a schematic view illustrating an example of an embodiment of an image display device having the polarizing plate of the present invention (hereinafter, formally, also referred to as "the image display device of the present invention"). An image display device 7 of the present invention has an upper polarizing plate 6, an image display element 5, and a lower polarizing plate 3 in this order.

The lower polarizing plate 3 is the polarizing plate of the present invention and has the polarizer 1 and the optical element 2, and, in the image display device 7 of the present invention, the polarizer 1, the optical element 2, the image display element 5, and the upper polarizing plate 6 are disposed in this order.

In addition, an absorption axis 61 of the upper polarizing plate 6 and an absorption axis 31 of the lower polarizing plate 3 are parallel to each other.

Furthermore, an orientation direction 21 in the optical element 2 on the polarizer 1 side is parallel to the absorption axis 31 of the lower polarizing plate 3, and an orientation direction 22 in the optical element 2 on a side opposite to the polarizer 1 is perpendicular to the absorption axis 31 of the lower polarizing plate 3.

FIG. 2A illustrates an embodiment in which the lower polarizing plate 3 is the polarizing plate of the present invention, but the upper polarizing plate 6 may be the polarizing plate of the present invention.

Figure 2B:
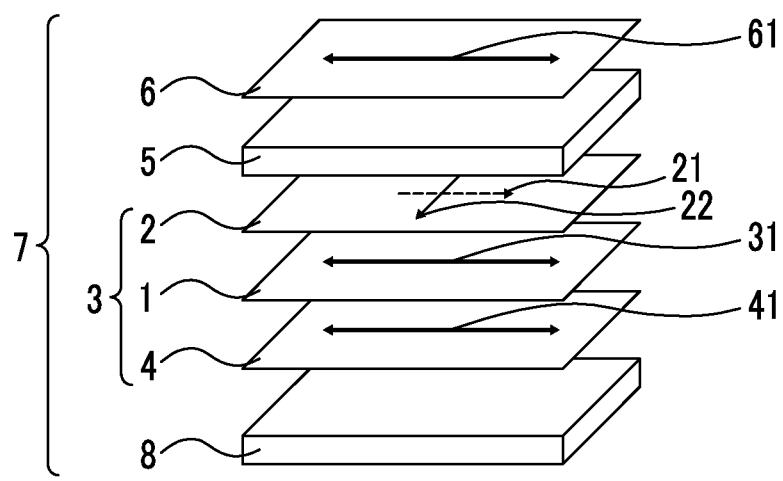
FIG. 2B is a schematic view illustrating another example of the embodiment of the image display device.

In another embodiment of the present invention, as illustrated in FIG. 2B, the brightness improvement film 4 is provided on the polarizer 1 on a side opposite to the optical element 2, and the absorption axis of the polarizer 1 (the absorption axis 31 of the polarizing plate 3) and a slow axis (main stretching axis) 41 of the brightness improvement film 4 are parallel to each other. The image display device 7 further includes a backlight unit 8, and the backlight unit 8, the brightness improvement film 4, the polarizer 1, the optical element 2, the image display element 5, and the upper polarizing plate 6 are disposed in this order.

Hereinafter, the respective members that are used in the present invention will be described in detail.

[Polarizer]

The polarizer that is used in the present invention is not particularly limited as long as the polarizer is a so-called linear polarizer having a function of converting natural light to specific linearly polarized light. The polarizer is not particularly limited, and absorption-type polarizers can be used.

{Material of Polarizer}

The material of the polarizer that is used in the present invention is not particularly limited, ordinarily-used polarizers can be used, and, for example, any of iodine-based polarizers, dye-based polarizers for which dichroic dyes are used, and polyene-based polarizers can be used.

In the case of using an iodine-based polarizer for which polyvinyl alcohol (PVA) manufactured by means of stretching is used, since PVA is hydrophilic, the polarizer is sensitive to changes in temperature or humidity and is likely to expand or contract due to ambient environmental changes, and thus the present invention is particularly effective.

[Optical Element]

The optical element that is used in the present invention is an optical element that rotates the polarization plane of polarized light emitted from the polarizer, and the orientation direction on one surface of the optical element and the orientation direction on the opposite surface are orthogonal to each other.

In addition, the optical element that is used in the present invention, $\Delta nd$ and the birefringence parameter $R_H$ fall in the range of a region surrounded by Point A at which $\Delta nd$ is 400 nm and the birefringence parameter $R_H$ is 0 degrees, Point B at which $\Delta nd$ is 400 nm and the birefringence parameter $R_H$ is $-11.6$ degrees, Point C at which $\Delta nd$ is 600 nm and the birefringence parameter $R_H$ is $-24.9$ degrees, and Point D at which $\Delta nd$ is 600 nm and the birefringence parameter $R_H$ is 0 degrees in an orthogonal coordinate in which $\Delta nd$ is indicated along the vertical axis and the birefringence parameter $R_H$ is indicated along the lateral axis. Here, the region refers to a region surrounded by a straight line connecting Point A and Point B, a straight line connecting Point B and Point C, a straight line connecting Point C and Point D, and a straight line connecting Point D and Point A.

In addition, in a case in which points in the coordinate are represented by ($\Delta nd$, $R_H$), $\Delta nd$ and the birefringence parameter $R_H$ preferably fall in a range of a region surrounded by (400 nm, 0 degrees), (400 nm, $-11.0$ degrees), (600 nm, $-23.2$ degrees), and (600 nm, 0 degrees), more preferably in the range of a region surrounded by (420 nm, $-3.0$ degrees), (420 nm, $-8.0$ degrees), (500 nm, $-12.4$ degrees), and (500 nm, $-3.0$ degrees), and still more preferably in the range of a region surrounded by (440 nm, $-4.2$ degrees), (440 nm, $-8.5$ degrees), (480 nm, $-10.3$ degrees), and (480 nm, $-6.2$ degrees).

In a case in which $\Delta nd$ is set in the above-described range, liquid crystal display devices are not easily tinted while displaying white, and, in a case in which $R_H$ is set in the above-described range, it is possible to set an Nz actuator in the fine film thickness of the optical element to 0.05 to 0.5. In a case in which $\Delta nd$ and $R_H$ are in the above-described ranges, the brightness of liquid crystal display devices in inclined directions increases, which is preferable.

Meanwhile, optical elements in which, as in so-called ordinary $\lambda/2$ plates, a phase difference of $\pi(\lambda/2)$ is generated due to the vibration of polarized light and, consequently, the vibration surface of the polarized light is converted 90° are not considered as the optical element that rotates the polarization plane of polarized light in the present invention.

In addition, the optical element in the present invention is preferably an optical element which includes a liquid crystal compound and is optically rotary since it is possible to further reduce the thickness of the polarizing plate.

In the present invention, being optically rotary means that linearly polarized light rotates and propagates in media while remaining substantially linearly polarized.

The liquid crystal compound that is used in the present invention is not particularly limited, and a variety of well-known liquid crystal compounds can be used depending on target optical characteristics. Meanwhile, in the present specification, including a liquid crystal compound means not only including a liquid crystal compound in a low-molecular-weight state before polymerization but also including a liquid crystal compound which has been polymerized and cured and thus already lost liquid crystallinity.

The method for producing the layer including a liquid crystal compound that is used in the present invention is not particularly limited, and it is possible to produce the layer by, for example, applying a composition made up of a liquid crystal compound, an orientation agent, a leveling agent, other additives, a solvent, and the like onto an orientation film.

{Liquid Crystal Compound}

Examples of the liquid crystal compound that is used in the present invention include rod-like liquid crystal compounds and disk-like liquid crystal (discotic liquid crystal) compounds, and disk-like liquid crystal compounds are preferably used.

As the disk-like liquid crystal compounds, for example, the disk-like liquid crystal compound described in JP2007-108732A or JP2010-244038A can be preferably used, but the disk-like liquid crystal compound is not limited thereto.

{Orientation of Liquid Crystal Compound}

The orientation directions of the liquid crystal compound that is used in the present invention on one surface of the optical element and the surface opposite thereto are orthogonal to each other. Specifically, the optical element can be produced using a method in which a chiral agent is added to a composition including the liquid crystal compound, orientation films are respectively disposed above and below a layer including the liquid crystal compound, and the orientation directions of the orientation films are converted 90° above and below the layer, thereby producing an optical element.

In addition, the twist angles of the liquid crystal compound need to be orthogonal to each other on the respective surfaces of the optical element, are not limited to 90°, and may be $(90+180 \times n)°$ (n represents an integer of 0 or more).

In this case, the twist angles can be adjusted using, for example, the kind and concentration of the chiral agent.

[Method for Manufacturing Optical Element]

The method for manufacturing the optical element is not particularly limited, and the optical element can be manufactured using, for example, a method including (1) a step of forming a coated film from a polymerizable composition including the liquid crystal compound and (2) a step of curing the coated film; a method further including (3) a step of biaxially stretching the coated film cured after the step (2), or the like.

In the step (1), first, a coated film is formed on a support, a substrate, or the like or on the surface of a reflection polarizer in the underlayer using a polymerizable composition including the liquid crystal compound (hereinafter, also abbreviated as "polymerizable liquid crystalline composition"). The polymerizable liquid crystalline composition is preferably prepared as a coating fluid in which a material is dissolved and/or dispersed in a solvent. The coating fluid can be applied using a variety of methods such as a wire bar coating method, an extrusion coating method, a direct gravure coating method, a reverse gravure coating method, and a die-coating method. In addition, it is also possible to form a coated film by emitting the liquid crystalline composition from nozzles using an ink jet device.

In the step (2), the coated film is irradiated with ultraviolet rays, thereby causing a curing reaction to proceed. In the ultraviolet irradiation, a light source such as an ultraviolet lamp is used. In this step, the curing reaction of the polymerizable liquid crystalline composition is caused to proceed by irradiating the polymerizable liquid crystalline composition with ultraviolet rays, and liquid crystalline phases are fixed.

The irradiation energy amount of ultraviolet rays is not particularly limited, but generally, preferably approximately 100 mJ/cm² to 800 mJ/cm². In addition, the time during which the coated film is irradiated with ultraviolet rays is not particularly limited and can be determined from the viewpoint of both the sufficient strength and productivity of the cured film.

In order to accelerate the curing reaction, the ultraviolet radiation may be carried out under heating conditions.

In addition, since the concentration of oxygen in the atmosphere has an influence on the degree of polymerization, in a case in which the degree of polymerization fails to reach a desired value in the air and the film hardness is insufficient, it is preferable to decrease the concentration of oxygen in the atmosphere using a method such as nitrogen substitution. The preferred concentration of oxygen is preferably 10% or less, more preferably 7% or less, and most preferably 3% or less.

From the viewpoint of maintaining the mechanical strength of the layer or suppressing the outflow of unreacted substances from the layer, the reaction percentage of the curing reaction (for example, a polymerization reaction) caused to proceed by the ultraviolet irradiation is preferably 70% or more, more preferably 80% or more, and still more preferably 90% or more. In order to improve the reaction percentage, a method for increasing the amount of ultraviolet rays radiated or polymerization under a nitrogen atmosphere or heating conditions is effective. In addition, it is also possible to use a method in which the coated film is once polymerized and then held at a temperature state higher than the polymerization temperature, thereby further accelerating the reaction by means of a thermopolymerization reaction or a method in which the coated film is irradiated with ultraviolet rays again (here, the coated film is irradiated under conditions satisfying the conditions of the present invention). The reaction percentage can be measured by comparing the absorption intensities of the infrared vibration spectrum of reactive groups (for example, polymerizable groups) before and after the proceeding of the reaction.

Here, regarding a state in which the liquid crystal phases "are fixed", a state in which the orientation of the liquid crystal compound is held is the most typical and preferably aspect. The state is not limited to the above-described state and, specifically, means a state in which the layer is not fluidic in a temperature range of, generally, 0° C. to 50° C. or −30° C. to 70° C. under severer conditions, additionally, the orientation form is not changed by external fields or external forces, and the fixed orientation form can be continuously maintained in a stable manner.

In the step (3), the cured layer obtained in the step (2) is biaxially stretched.

For the biaxial stretching, well-known methods can be used.

A film having the produced coated film in a cholesteric liquid crystalline phase may be vertically stretched at a desired stretching ratio in a vertical uniaxial stretcher and then may be horizontally stretched at a desired stretching ratio in a tenter-type stretcher. In this case, the transportation direction is considered as vertical, and the direction orthogonal to the transportation direction is considered as horizontal. Alternatively, the film may be horizontally stretched and then vertically stretched. Both end portions of the biaxially-stretching film may be cut off before a winding portion, and the film may be wound in the winding portion, thereby producing a rolled film.

The air-intake temperature, the film surface temperature, and the stretching speed during the stretching can be appropriately adjusted depending on desired stretching ratios.

The film surface temperature during the stretching is preferably Tg (the glass transition point of a support on which the cholesteric liquid crystalline phase is formed)–40° C. to Tg+20° C. and more preferably Tg−20° C. to Tg+10° C.

In addition, the stretching ratio in the case of stretching is appropriately adjusted so that the relationship between Δnd and the birefringence parameter $R_H$ falls into a prescribed range. In order to set the relationship in the prescribed range, the stretching ratios are preferably set to 1 to 30%, more preferably set to 5 to 25%, and most preferably set to 15 to 20% horizontally and vertically.

{Brightness Improvement Film}

The brightness improvement film that is used in the present invention is not particularly limited, and a variety of well-known brightness improvement films can be used. Specific examples thereof include the dielectric multilayer films and the like described in JP04091978B.

[Image Display Element]

The image display element that is used in the present invention is not particularly limited, and liquid crystal display elements and the like can be used.

The mode of liquid crystal cells in the liquid crystal display element that is used in the present invention is not particularly limited, and examples thereof include the in-plane switching (IPS) mode, the vertical alignment (VA) mode, and the like.

EXAMPLES

Hereinafter, the present invention will be described in more detail on the basis of examples. Materials, amounts used, ratios, processing contents, processing orders, and the like described in the following examples can be appropriately modified within the scope of the gist of the present invention. Therefore, the scope of the present invention is not supposed to be interpreted restrictively by the examples described below.

Example 1

[Production of Optical Element 1]
<Support>

Pellets of a mixture (Tg 127° C.) of an acrylic resin having a lactone ring structure represented by General Formula (III) {the mass ratio of copolymerized monomers (methyl methacrylate/methyl 2-(hydroxymethyl)acrylate): 8/2, the lactone ring formation percentage: approximately 100%, the content ratio of the lactone ring structure: 19.4%, the weight-average molecular weight: 133,000, the melt flow rate: 6.5 g/10 minutes (240° C., 10 kgf), Tg: 131° C.} (90 parts by mass) and an acrylonitrile-styrene (AS) resin {TOYO AS AS20 manufactured by Toyo Styrene Co., Ltd.} (10 parts by mass) were fed into a biaxial extruder and were melted and extruded in a sheet shape at approximately 280° C., thereby obtaining a 40 μm-thick long support.

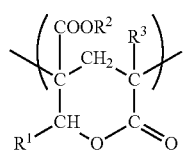
(III)

(In General Formula (III), $R^1$ represents a hydrogen atom, and $R^2$ and $R^3$ represent methyl groups.)

An alkali saponification treatment was carried out on the coated surface of the obtained support, and an orientation film coating fluid having the following composition, the concentration of which was adjusted so that the dried film thickness of a composition for an orientation film 1 having the following composition reached 0.5 μm was continuously applied using a #14 wire bar. After the film was dried with 60° C. hot air for 60 seconds and, furthermore, 100° C. hot air for 120 seconds, and a rubbing treatment was carried out in a direction parallel to the longitudinal direction, thereby producing an orientation film-attached support 1. The degree of saponification of the modified polyvinyl alcohol used was 96.8%.

Composition of Orientation Film Coating Fluid:

| | |
|---|---|
| The following modified polyvinyl alcohol | 10 parts by mass |
| Water | 308 parts by mass |
| Methanol | 70 parts by mass |
| Isopropanol | 29 parts by mass |
| Photopolymerization initiator (IRGACURE 2959, manufactured by BASF) | 0.8 parts by mass |

(Modified Polyvinyl Alcohol)

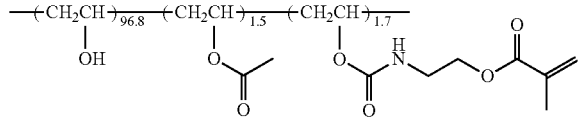

(In the formula, numerical values attached to repeating units represent the molar ratios of the respective repeating units.)

A composition 1 including a liquid crystal compound having the following composition was applied onto the orientation film-attached support 1 produced above and was dried, irradiated with ultraviolet rays, and then biaxially stretched, thereby producing an optical element 1.

Specifically, first, the composition 1 including the following liquid crystal compound was dissolved in methyl ethyl ketone (MEK) at a concentration adjusted so that the dried film thickness reached 4.4 μm, thereby preparing a coating fluid for forming a layer including the liquid crystal compound. This coating film was bar-applied onto the orientation film, was heated and aged at 110° C. for one minute, thereby obtaining a uniform orientation state. After that, this coating fluid was held at 45° C. and was irradiated with ultraviolet rays using a high-pressure mercury lamp in a nitrogen atmosphere, then, the four sides were fixed to a tenter-type stretcher, and biaxial stretching was carried out at 120° C. and vertical and horizontal stretching ratios of 5% respectively, thereby obtaining the optical element 1. The film thickness of the layer including the liquid crystal compound after the completion was 4.0 μm.

Composition 1 Including Liquid Crystal Compound

| The following compound 1 (discotic liquid crystal (DLC)) | 80 parts by mass |
|---|---|
| The following compound 2 (discotic liquid crystal (DLC)) | 20 parts by mass |
| The following surfactant 1 | 0.5 parts by mass |
| The following polymerization initiator 1 | 3 parts by mass |
| The following chiral agent 1 | 0.09 parts by mass |

Compound 1

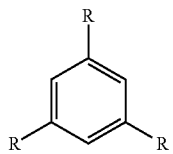

$R=$ 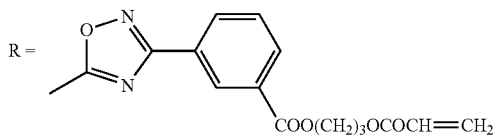

Compound 2

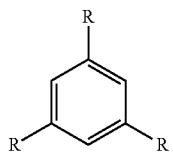

$R=$ 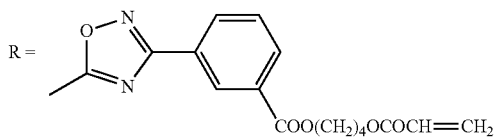

Surfactant 1

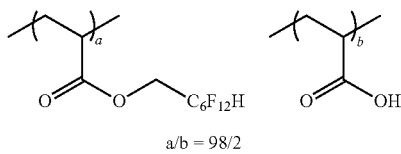

a/b = 98/2

In the structural formula of Surfactant 1, the expression of a/b=98/2 indicates that the content of a is 98% by mass and the content of b is 2% by mass.

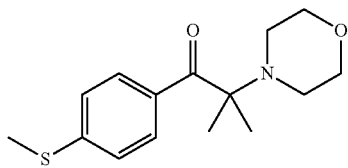

Polymerization initiator 1

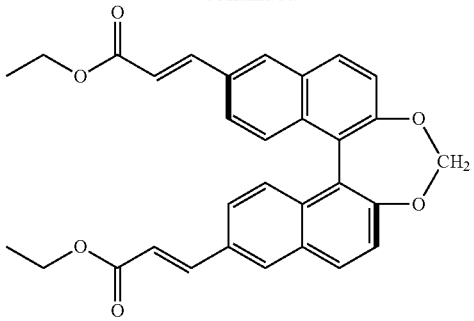

Chiral agent 1

The orientation direction on the support side of the layer including the liquid crystal compound produced above was parallel to the rubbing direction of the orientation film, and the orientation direction on the side opposite to the support (air interface side) was orthogonal to the rubbing direction of the orientation film. In addition, the optical element was disposed so that the support side came close to the emitted light side so that the absorption axis of an incidence ray polarizer in a polarization microscope and the rubbing direction of the optical element coincided with each other in the polarization microscope, and the angle at which the brightness was maximized was measured by rotating an analyzer, which was 90 degrees. In addition, it was confirmed that the optical element 1 can be continuously manufactured using the same method as the above-described production method. In this case, the transportation direction is parallel to the rubbing direction of the orientation film.

<Production of Polarizer 1>

A 45 μm-thick PVA film was immersed in an aqueous solution of iodine having a concentration of iodine of 0.05% by mass at 30° C. for 60 seconds so as to be dyed, then, was stretched five times the original length while being immersed in an aqueous solution of boric acid having a concentration of boric acid of 4% by mass for 60 seconds, and then was dried at 50° C. for four minutes, thereby obtaining a 15 μm-thick polarizer 1. At this time, the stretching direction was parallel to the absorption axis direction.

In addition, it was confirmed that the polarizer 1 can be continuously manufactured using the same method as the above-described production method. In this case, the transportation direction is parallel to the vertical stretching direction.

<Production of Polarizing Plate 1>

A saponification treatment was carried out on the coated surface and the surface opposite thereto of the support in the optical element 1 produced above, and the support in the optical element 1 and the polarizer 1 were attached together using a commercially available polyvinyl alcohol-based adhesive, thereby producing a polarizing plate 1. At this time, the absorption axis direction of the polarizer 1 and the rubbing direction of the orientation film in the optical element 1 are disposed to be parallel to each other. To the other surface of the polarizer 1, TD80 (manufactured by Fujifilm Corporation) which is a cellulose acetate film was attached using a polyvinyl alcohol-based adhesive.

In addition, it was confirmed that the polarizing plate 1 can be continuously manufactured using the same method as the above-described production method.

Example 2

An optical element 2 was produced in the same manner as the optical element 1 produced in Example 1 except for the fact that the concentration of the chiral agent was set to 0.09 parts by mass, the dried film thickness was set to 7.5 µm, and the stretching ratio was set to 20%. The completed film thickness was 5.2 µm.

In addition, a polarizing plate 2 was produced using the same method as in Example 1 except for the fact that the optical element 2 was used instead of the optical element 1.

Example 3

An optical element 3 was produced in the same manner as the optical element 1 produced in Example 1 except for the fact that the concentration of the chiral agent was set to 0.04 parts by mass, the dried film thickness was set to 9.8 µm, and the stretching ratio was set to 28%. The completed film thickness was 6.0 µm.

In addition, a polarizing plate 3 was produced using the same method as in Example 1 except for the fact that the optical element 3 was used instead of the optical element 1.

Example 4

An optical element 4 was produced in the same manner as the optical element 1 produced in Example 1 except for the fact that the concentration of the chiral agent was set to 0.13 parts by mass, the dried film thickness was set to 3.0 µm, and the stretching was not carried out.

In addition, a polarizing plate 4 was produced using the same method as in Example 1 except for the fact that the optical element 4 was used instead of the optical element 1.

Comparative Example 1

A polarizing plate 5 was produced in the same manner except for the fact that, in the polarizing plate 1 produced in Example 1, a laminate forming by laminating two commercially available λ/2 plates (PURE-ACE TT-138 manufactured by Teijin Limited, the slow axis direction and the longitudinal direction coincide with each other) was used instead of the optical element 1. At this time, the λ/2 plates were cut in a 45° direction and were attached to the polarizer 1 using a pressure sensitive adhesive in order to dispose the slow axes of the λ/2 plates and the absorption axis of the polarizer 1 at 45°.

Since the above-described step of cutting the λ/2 plates in a 45° direction is required, the polarizing plate 5 cannot be continuously manufactured.

Example 5

A polarizing plate 6 was produced by attaching a dielectric multilayer film (DBEF manufactured by 3M Company) obtained by disassembling 42LF5800 manufactured by LG electronics using a pressure sensitive adhesive so as to come into contact with the surface of TD80 in the polarizer 1 in the polarizing plate 1 produced in Example 1.

At this time, the slow axis direction of the dielectric multilayer film and the absorption axis direction of the polarizer 1 were set to be parallel to each other.

In addition, it was confirmed that the polarizing plate 6 can be continuously manufactured using the same method as the above-described production method.

Comparative Example 2

An optical element 5 was produced in the same manner as the optical element 1 produced in Example 1 except for the fact that the concentration of the chiral agent was set to 0.03 parts by mass, the dried film thickness was set to 12.7 µm, and the stretching ratio was set to 33%. The completed film thickness was 7.2 µm.

In addition, a polarizing plate 7 was produced using the same method as in Example 1 except for the fact that the optical element 5 was used instead of the optical element 1.

Comparative Example 3

An optical element 6 was produced in the same manner as the optical element 1 produced in Example 1 except for the fact that the concentration of the chiral agent was set to 0.06 parts by mass, the dried film thickness was set to 6.2 µm, and the stretching ratio was set to 20%. The completed film thickness was 4.3 µm.

In addition, a polarizing plate 8 was produced using the same method as in Example 1 except for the fact that the optical element 6 was used instead of the optical element 1.

Comparative Example 4

An optical element 7 was produced in the same manner as the optical element 1 produced in Example 1 except for the fact that the concentration of the chiral agent was set to 0.03 parts by mass, the dried film thickness was set to 10.6 µm, and the stretching ratio was set to 20%. The completed film thickness was 7.3 µm.

In addition, a polarizing plate 9 was produced using the same method as in Example 1 except for the fact that the optical element 7 was used instead of the optical element 1.

Comparative Example 5

An optical element 8 was produced using a rod-like liquid crystal compound (rod-like liquid crystals (RLC)) in the same manner as in Example 4 except for the fact that the formulation described in "0168" and "0169" of JP2012-39222A was used instead of the composition 1 including the liquid crystal compound used in Example 4. The dried film thickness was set to 3.0 µm, and the stretching was not carried out.

In addition, a polarizing plate 10 was produced using the same method as in Example 1 except for the fact that the optical element 8 was used instead of the optical element 1.

<Measurement of Twist Angle and αnd>

Δnd was measured using AxoScan OPMF-1 (manufactured by Opto Science, Inc.) and the attached device analysis software Axometrics Multi-Layer Analysis.

In this case, as parameters for calculation, actual measurement values obtained by measuring the film thicknesses of liquid crystal layers by means of cross-section observation were used, fitting was carried out with the refractive indexes of liquid crystals set to 1.48 for ne and to 0° for neOrientation, and the twist angles and Δnd of the liquid crystal compounds were obtained. The results are shown in Table 1 below.

<Measurement of $R_H$>

$R_H$ was computed from the obtained Mueller matrix measured at an azimuthal angle of 0 degrees and a polar angle of 60 degrees with respect to the slow axis using AxoScan OPMF-1 (manufactured by Opto Science, Inc.). The results are shown in Table 1 below.

As the values of $R_H$, values at wavelengths (Δnd) nm were used. In Comparative Example 1, measurement at a wavelength of 276 nm was not possible.

TABLE 1

|  |  | EXAMPLE 1<br>Polarizing<br>plate 1<br>Optical<br>element 1 | EXAMPLE 2<br>Polarizing<br>plate 2<br>Optical<br>element 2 | EXAMPLE 3<br>Polarizing<br>plate 3<br>Optical<br>element 3 | EXAMPLE 4<br>Polarizing<br>plate 4<br>Optical<br>element 4 | COMPARATIVE<br>EXAMPLE 1<br>Polarizing plate 5<br>λ/2 plate | EXAMPLE 5<br>Polarizing<br>plate 6<br>Optical<br>element 1 |
|---|---|---|---|---|---|---|---|
| Constitution | Material | Discotic liquid crystal (DLC) | Discotic liquid crystal (DLC) | Discotic liquid crystal (DLC) | Discotic liquid crystal (DLC) | PURE-ACE TT-138 | Discotic liquid crystal (DLC) |
|  | Amount of chiral agent (parts by mass) | 0.09 | 0.05 | 0.04 | 0.13 | — | 0.09 |
|  | Liquid crystal film thickness (μm) Before stretching | 4.4 | 7.5 | 9.8 | 3.0 | — | 4.4 |
|  | After stretching | 4.0 | 5.2 | 6.0 | 3.0 | — | 4.0 |
|  | Stretching ratio (%) | 5 | 20 | 28 | 0 | — | 5 |
| Characteristics | Δnd (nm) | 460 | 460 | 460 | 460 | 276 | 460 |
|  | $R_H$ (degrees) | −14.2 | −8.2 | −0.7 | −17.1 | — | −14.2 |
|  | Twist angle (degrees) | 90 | 90 | 90 | 90 | 0 | 90 |

|  |  | COMPARATIVE<br>EXAMPLE 2<br>Polarizing plate 7<br>Optical element 5 | COMPARATIVE<br>EXAMPLE 3<br>Polarizing plate 8<br>Optical element 6 | COMPARATIVE<br>EXAMPLE 4<br>Polarizing plate 9<br>Optical element 7 | COMPARATIVE<br>EXAMPLE 5<br>Polarizing plate 10<br>Optical element 8 |
|---|---|---|---|---|---|
| Constitution | Material | Discotic liquid crystal (DLC) | Discotic liquid crystal (DLC) | Discotic liquid crystal (DLC) | Rod-like liquid crystal (RLC) |
|  | Amount of chiral agent (parts by mass) | 0.03 | 0.06 | 0.03 | 0.1 |
|  | Liquid crystal film thickness (μm) Before stretching | 12.7 | 6.2 | 10.6 | 3.0 |
|  | After stretching | 7.2 | 4.3 | 7.3 | 3.0 |
|  | Stretching ratio (%) | 33 | 20 | 20 | 0 |
| Characteristics | Δnd (nm) | 460 | 380 | 650 | 460 |
|  | $R_H$ (degrees) | 4 | −5.1 | −13.4 | 20.2 |
|  | Twist angle (degrees) | 90 | 90 | 90 | 90 |

Example 6

A polarizing plate on the backlight side of a commercially available IPS-type liquid crystal television (42LF5800 manufactured by LG electronics) was peeled off, and, instead, the polarizing plate 1 produced in Example 1 was attached to the television with the liquid crystal cell side located on the optical element side, thereby producing an image display device 1 of Example 6. At this time, the absorption axis direction of the polarizing plate 1 was set in the longitudinal direction (horizontal direction) with respect to the screen. In addition, the absorption axis direction of the polarizing plate on the viewer side was the longitudinal direction (horizontal direction) with respect to the screen, and the absorption axis direction of the polarizing plate on the viewer side and the absorption axis direction of the polarizing plate on the backlight side were set to be parallel to each other.

Example 7

An image display device 2 was produced in the same manner except for the fact that the polarizing plate 1 was replaced by the polarizing plate 2 in the image display device 1 of Example 6.

Example 8

An image display device 3 was produced in the same manner except for the fact that the polarizing plate 1 was replaced by the polarizing plate 3 in the image display device 1 of Example 6.

Example 9

An image display device 4 was produced in the same manner except for the fact that the polarizing plate 1 was replaced by the polarizing plate 4 in the image display device 1 of Example 6.

Comparative Example 6

An image display device 5 was produced in the same manner except for the fact that the polarizing plate 1 was replaced by the polarizing plate 5 in the image display device 1 of Example 6.

Comparative Example 7

An image display device 6 was produced in the same manner except for the fact that the polarizing plate 1 was replaced by the polarizing plate 7 in the image display device 1 of Example 6.

Comparative Example 8

An image display device 7 was produced in the same manner except for the fact that the polarizing plate 1 was replaced by the polarizing plate 8 in the image display device 1 of Example 6.

Comparative Example 9

An image display device 8 was produced in the same manner except for the fact that the polarizing plate 1 was replaced by the polarizing plate 9 in the image display device 1 of Example 6.

Comparative Example 10

An image display device 9 was produced in the same manner except for the fact that the polarizing plate 1 was replaced by the polarizing plate 10 in the image display device 1 of Example 6.

[Evaluation]

<Continuous Manufacturing Suitability>

In the image display devices of Examples 6 to 9 and Comparative Examples 7 to 10, all of the respective polarizing plates used were found to have continuous manufacturing suitability and were evaluated as "possible". The results are shown in Table 2 below.

<Bending>

The image display devices of Examples 6 to 9 and Comparative Examples 6 to 10 were thermally treated at 50° C. and a relative humidity of 80% for 72 hours and then were left to stand at 25° C. and a relative humidity of 60% for two hours, the backlights of the image display devices were lit, liquid crystal cells were removed by disassembling the image display devices ten minutes after the lighting, and the shapes of the liquid crystal cells were checked.

Image display devices in which the deformation of the shapes of the liquid crystal cells was not observed were evaluated as "A", and image display devices in which the warpage of the liquid crystal cells was observed were evaluated as "B". The results are shown in Table 2 below.

<Tinting of Front Surface>

In the image display devices of Examples 6 to 9 and Comparative Examples 6 to 10, front surface tinting while the front surface displayed white was visually checked by an evaluator. The front surface is preferably neutral.

<Measurement of Oblique Brightness>

In the image display devices of Examples 6 to 9 and Comparative Examples 6 to 10, brightness while the image display device displayed white was measured using EZ-Contrast160D (manufactured by ELDIM). From these measurement data, 24 data at intervals of a polar angle of 70 degrees and an azimuthal angle of 15 degrees were extracted, and the arithmetic average value was computed and used as the oblique brightness.

The brightness obtained in Comparative Example 10 was standardized as 100 and used in the evaluation, and the results are shown in Table 2 below.

TABLE 2

| | | EXAMPLE 6 Image display device 1 | EXAMPLE 7 Image display device 2 | EXAMPLE 8 Image display device 3 | EXAMPLE 9 Image display device 4 | COMPARATIVE EXAMPLE 6 Image display device 5 |
|---|---|---|---|---|---|---|
| Constitution | Polarizing plate | Polarizing plate 1 | Polarizing plate 2 | Polarizing plate 3 | Polarizing plate 4 | Polarizing plate 5 |
| | In-plane slow axis angle of top surface (°) | 90 | 90 | 90 | 90 | 45 |
| | In-plane slow axis angle of bottom surface (°) | 0 | 0 | 0 | 0 | 45 |
| | Relationship between absorption axes of first/second polarizing plates | Parallel | Parallel | Parallel | Parallel | Parallel |
| Effects | Continuous manufacturing suitability | Possible | Possible | Possible | Possible | Impossible |
| | Bending | A | A | A | A | B |
| | Tinting of front surface | Neutral | Neutral | Neutral | Neutral | Neutral |
| | Oblique brightness* | 103 | 105 | 103 | 102 | 100 |

| | | COMPARATIVE EXAMPLE 7 Image display device 6 | COMPARATIVE EXAMPLE 8 Image display device 7 | COMPARATIVE EXAMPLE 9 Image display device 8 | COMPARATIVE EXAMPLE 10 Image display device 9 |
|---|---|---|---|---|---|
| Constitution | Polarizing plate | Polarizing plate 7 | Polarizing plate 8 | Polarizing plate 9 | Polarizing plate 10 |
| | In-plane slow axis angle of top surface (°) | 90 | 90 | 90 | 90 |
| | In-plane slow axis angle of bottom surface (°) | 0 | 0 | 0 | 0 |
| | Relationship between absorption axes of first/second polarizing plates | Parallel | Parallel | Parallel | Parallel |
| Effects | Continuous manufacturing suitability | Possible | Possible | Possible | Possible |
| | Bending | A | A | A | A |
| | Tinting of front surface | Neutral | Bluish | Reddish | Neutral |
| | Oblique brightness* | 94 | 103 | 103 | 100 |

*A value obtained by standardizing the average of brightness measured every polar angle of 70 degrees and azimuthal angle of 15 degrees on the basis of that in Comparative Example 10 as 100

From the results shown in Table 2, it was found that, in the image display devices of Examples 6 to 9, the deformation of the shapes of the liquid crystal cells was not observed, and the bending property was excellent. The liquid crystal cells in Comparative Example 6 were concave on the viewer side in the longitudinal direction.

In addition, from the results of the oblique brightness in Examples 6 to 9, it was found that the oblique brightness was superior to that in Comparative Example 10, and the light amount of the oblique view can be increased.

In addition, while the tints were neutral in Examples 6 to 9, the front surface became bluish in Comparative Example 8 in which Δnd was below the lower limit, and the front surface became reddish in Comparative Example 9 in which Δnd was above the upper limit.

Examples 6 to 9 were excellent in terms of both items such as bending, the tinting of the front surface, and the oblique brightness.

EXPLANATION OF REFERENCES

1: polarizer
2: optical element
21: orientation direction in optical element on polarizer side
22: orientation direction in optical element on side opposite to polarizer
3: polarizing plate
31: absorption axis of lower polarizing plate
4: brightness improvement film
41: slow axis of brightness improvement film
5: image display element
6: upper polarizing plate
61: absorption axis of upper polarizing plate
7: image display device
8: backlight unit
91: film before stretching
92: tenter
93: film after stretching

What is claimed is:

1. A polarizing plate comprising:
a polarizer; and
an optical element that rotates a polarization plane of polarized light emitted from the polarizer,
wherein an orientation direction on a surface of the optical element on a polarizer side is parallel to an absorption axis of the polarizer,
an orientation direction on a surface of the optical element opposite to the polarizer is perpendicular to the absorption axis of the polarizer, and
values for Δnd and a birefringence parameter $R_H$ of the optical element are in a range of a region surrounded by Point A at which Δnd is 400 nm and the birefringence parameter $R_H$ is 0 degrees, Point B at which Δnd is 400 nm and the birefringence parameter $R_H$ is −11.6 degrees, Point C at which Δnd is 600 nm and the birefringence parameter $R_H$ is −24.9 degrees, and Point D at which Δnd is 600 nm and the birefringence parameter $R_1$ is 0 degrees; wherein in an orthogonal coordinate system, values for Δnd are indicated along a vertical axis and values for the birefringence parameter $R_H$ are indicated along a lateral axis; and
wherein the region refers to an area bounded by a straight line connecting Point A and Point B, a straight line connecting Point B and Point C, a straight line connecting Point C and Point D, and a straight line connecting Point D and Point A.

2. The polarizing plate according to claim 1, wherein the optical element includes a liquid crystal compound and is optically rotary.

3. The polarizing plate according to claim 2, further comprising:
a brightness improvement film on a side of the polarizer opposite to the optical element,
wherein the absorption axis of the polarizer and a slow axis of the brightness improvement film are parallel to each other.

4. The polarizing plate according to claim 3, wherein manufacturing transportation directions of the polarizer and the brightness improvement film are parallel to each other.

5. The polarizing plate according to claim 1, further comprising:
a brightness improvement film on a side of the polarizer opposite to the optical element,
wherein the absorption axis of the polarizer and a slow axis of the brightness improvement film are parallel to each other.

6. The polarizing plate according to claim 5, wherein manufacturing transportation directions of the polarizer and the brightness improvement film are parallel to each other.

* * * * *